(12) United States Patent
Hirsch et al.

(10) Patent No.: US 10,772,404 B1
(45) Date of Patent: Sep. 15, 2020

(54) INTERCHANGEABLE COVERS FOR A MOBILE DEVICE ACCESSORY

(71) Applicant: HANDL NEW YORK, LLC, New York, NY (US)

(72) Inventors: Allen Hirsch, New York, NY (US); Timothy A. Hemesath, Costa Mesa, CA (US)

(73) Assignee: HANDL NEW YORK, LLC, New York, NY (US)

( * ) Notice: Subject to any disclaimer, the term of this patent is extended or adjusted under 35 U.S.C. 154(b) by 0 days.

(21) Appl. No.: 16/600,377

(22) Filed: Oct. 11, 2019

(51) Int. Cl.
| H04B 1/38 | (2015.01) |
| A45C 11/00 | (2006.01) |
| F16M 13/00 | (2006.01) |
| H04B 1/3888 | (2015.01) |
| B65H 75/02 | (2006.01) |

(52) U.S. Cl.
CPC .............. *A45C 11/00* (2013.01); *B65H 75/02* (2013.01); *F16M 13/005* (2013.01); *H04B 1/3888* (2013.01); *A45C 2011/002* (2013.01); *A45C 2200/15* (2013.01)

(58) Field of Classification Search
CPC combination set(s) only.
See application file for complete search history.

(56) References Cited

U.S. PATENT DOCUMENTS

| 2,732,602 | A | 1/1956 | Quimby |
| 5,751,545 | A | 5/1998 | Jung |
| 6,457,788 | B1 | 10/2002 | Perez et al. |
| 7,367,089 | B2 | 5/2008 | Cooke et al. |
| 7,486,506 | B2 | 2/2009 | Chen et al. |
| 8,485,112 | B1 | 7/2013 | Madden |
| 9,300,346 | B2 | 3/2016 | Hirsch |
| 9,647,714 | B2 | 5/2017 | Hirsch |
| 9,793,941 | B1 | 10/2017 | Hirsch |
| 10,153,800 | B2 | 12/2018 | Hirsch |
| 10,178,903 | B2 | 1/2019 | Guerdrum et al. |
| 2011/0309728 | A1* | 12/2011 | Diebel ............... H04B 1/3888 312/293.1 |
| 2014/0007408 | A1* | 1/2014 | Nool ............... B65D 25/22 29/525.01 |
| 2014/0091192 | A1* | 4/2014 | Mersky ............ F16M 11/041 248/447 |

* cited by examiner

*Primary Examiner* — Junpeng Chen
(74) *Attorney, Agent, or Firm* — Louis J. Hoffman; Justin J. Lesko

(57) ABSTRACT

A removable cover for a finger brace comprises a receiving end with an open area for receiving the finger brace within the cover and with rails to slide the cover over the finger brace. A stop bar of the cover acts as a stop for the finger brace. The cover includes a spring-loaded clip arranged across the stop bar and rotatable around a fulcrum. A protrusion/recess pair between the clip and the finger brace is normally engaged with a spring and acts as a catch when the cover is in place over the finger brace. A recess in the cover receives an end of the clip when a user presses the end against the spring force to disengage the protrusion/recess pair.

7 Claims, 9 Drawing Sheets

INTERCHANGEABLE COVERS FOR A MOBILE DEVICE ACCESSORY

BACKGROUND OF THE INVENTION

The field of the present invention relates to accessories for hand-held mobile devices such as mobile phones and computer tablets. In particular, the field of the present invention relates to interchangeable decorative covers and related clipping mechanisms, having use with an apparatus that assists a user with holding a mobile device that has a front-facing display screen.

U.S. Pat. No. 9,300,346 describes an apparatus that assists users in holding a mobile device that includes a finger brace coupled to a case covering at least part of the rear of the mobile device. Currently, no system is known to exist to allow a user to customize the look of the finger brace without entirely replacing it.

SUMMARY

A removable cover for a finger brace comprises a receiving end of the cover with an open area for receiving the finger brace within the cover and with left and right side rails that engage all or part of the finger brace when sliding the cover over at least the outside surface of the finger brace. The cover has a stop bar opposite the receiving end and short of the opposite end, which acts as a stop for the finger brace when the cover slides over the finger brace and is in contact with the finger brace when the cover is in place on the finger brace.

The cover includes a spring-loaded clip arranged across the stop bar. A protrusion/recess pair between a first end of the clip and the finger brace is normally engaged with a spring to act as a catch when the cover is in place on the finger brace. The protrusion can be on the finger brace with the recess on the clip, or the recess can be on the finger brace with the protrusion on the clip.

A recess in the cover, located past the stop bar and before the end opposite to the receiving end, receives a second end of the clip when a user presses the second end against the spring force, thereby causing the first end of the clip to be urged away from the finger brace to disengage the protrusion/recess pair.

The cover and related attachment systems described herein facilitate the ability of a user to select from among various alternate covers for the finger brace, to allow different decorations or materials. The cover and related attachment systems described herein facilitate securely holding the cover against the finger brace. However, the covers can also easily be removed from the finger brace. In this way, the different covers are interchangeable and can be easily swapped according to user preferences. The interchangeable covers and related clipping mechanisms described herein are also applicable to other accessories that would benefit from interchangeable covers.

Objects and advantages pertaining to interchangeable, removable, and secure finger brace covers may become apparent upon referring to the example embodiments illustrated in the drawings and disclosed in the following written description or appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects and applications of the invention presented here are described below in the drawings and detailed description of the invention.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

Elements and acts in the figures are illustrated for simplicity and have not necessarily been rendered according to any particular sequence or embodiment.

Embodiments depicted are shown only schematically, and not all features may be shown in full detail or in proper proportion. Certain features or structures may be exaggerated relative to others for clarity. The embodiments shown are examples only and should not be construed as limiting the scope of the present disclosure or appended claims.

DETAILED DESCRIPTION OF SELECTED EMBODIMENTS

In the following description, numerous specific details are set forth to explain and provide a thorough understanding of various aspects of the invention. It will be understood, however, by those skilled in the relevant arts, that the present invention may be practiced without all disclosed specific details. In some instances, known structures and devices are shown or discussed more generally to avoid obscuring the invention. In many cases, a description of the operation is sufficient to enable one to implement the various forms of the invention. There are many different and alternative configurations, devices, and technologies to which the disclosed inventions may be applied. The full scope of the inventions is not limited to the examples that are described below.

Figure 1:
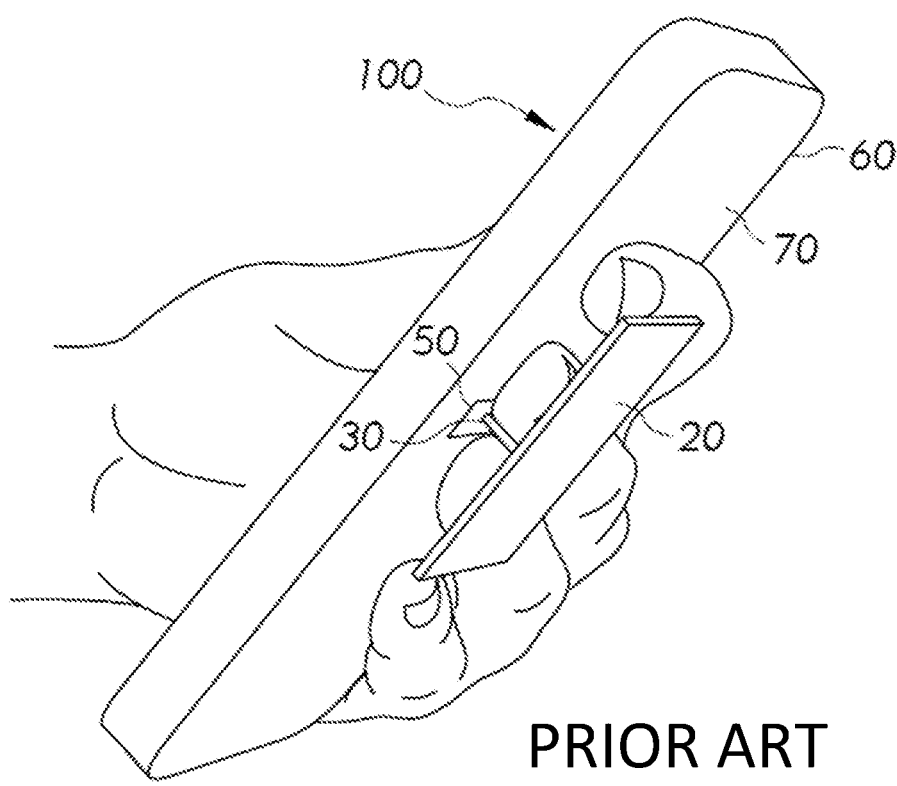
FIG. 1 depicts a finger brace of U.S. Pat. No. 9,300,346, with the finger brace connected by a flexible member to a case for a handheld mobile device such as a cell phone.

FIG. 1 depicts an example of a finger brace 20 in accordance with U.S. Pat. No. 9,300,346 that connects via an elastic band or other flexible member 30 to a case 100 for a mobile device or other handheld device. The rear facing back portion 60 of case 100 has an exterior surface 70 that includes a hole 50, which in some embodiments can receive flexible member 30 and anchor finger brace 20 to an inside surface (not shown) of case 100. In other instances, flexible member 30 can attach to exterior surface 70. Hole 50, or another hole or slot (not shown), can receive an end of finger brace 20, and elastic band 30 assists in holding finger brace 20 against back portion 60 at one end with a second end positioned away from the mobile device, thereby forming a stand for the mobile device, as discussed in U.S. Pat. No. 9,300,346. To hold the mobile device, as shown in FIG. 1, fingers of one hand of a user can be placed on either side of flexible member 30. The user's fingers are shown in FIG. 1 as being between finger brace 20 and exterior surface 70 of the rear-facing back portion 60 of case 100. The user can press against finger brace 20 to brace the mobile device, thereby leaving the user's thumb free to operate the mobile device. The finger brace 20 can also be arranged with the user's fingers removed on one side and placed on the outside of finger brace 20, so as to press finger brace 20 on that side against rear-facing back portion 60, with fingers on the other side pressing against finger brace 20 so as to push it away from back portion 60, with elastic member 30 counterbalancing that force.

Although the cover described herein is disclosed in connection with finger brace 20 in accordance with U.S. Pat. No. 9,300,346, it may have use with other bar-shaped accessories, particularly those used in connection with holding mobile devices. For example, alternative known finger braces may be attached to a cell phone case (or a case for other mobile devices) via springs, such as in connection with a pop-in/out mechanism, or via bands attaching a brace in two or more places at a side of a case. Other accessories that may benefit from use of interchangeable covers might not be intended as, or suitable for use as, finger braces at all and may instead act as stands or cord-wrapping devices, or have other purposes.

Figure 2:
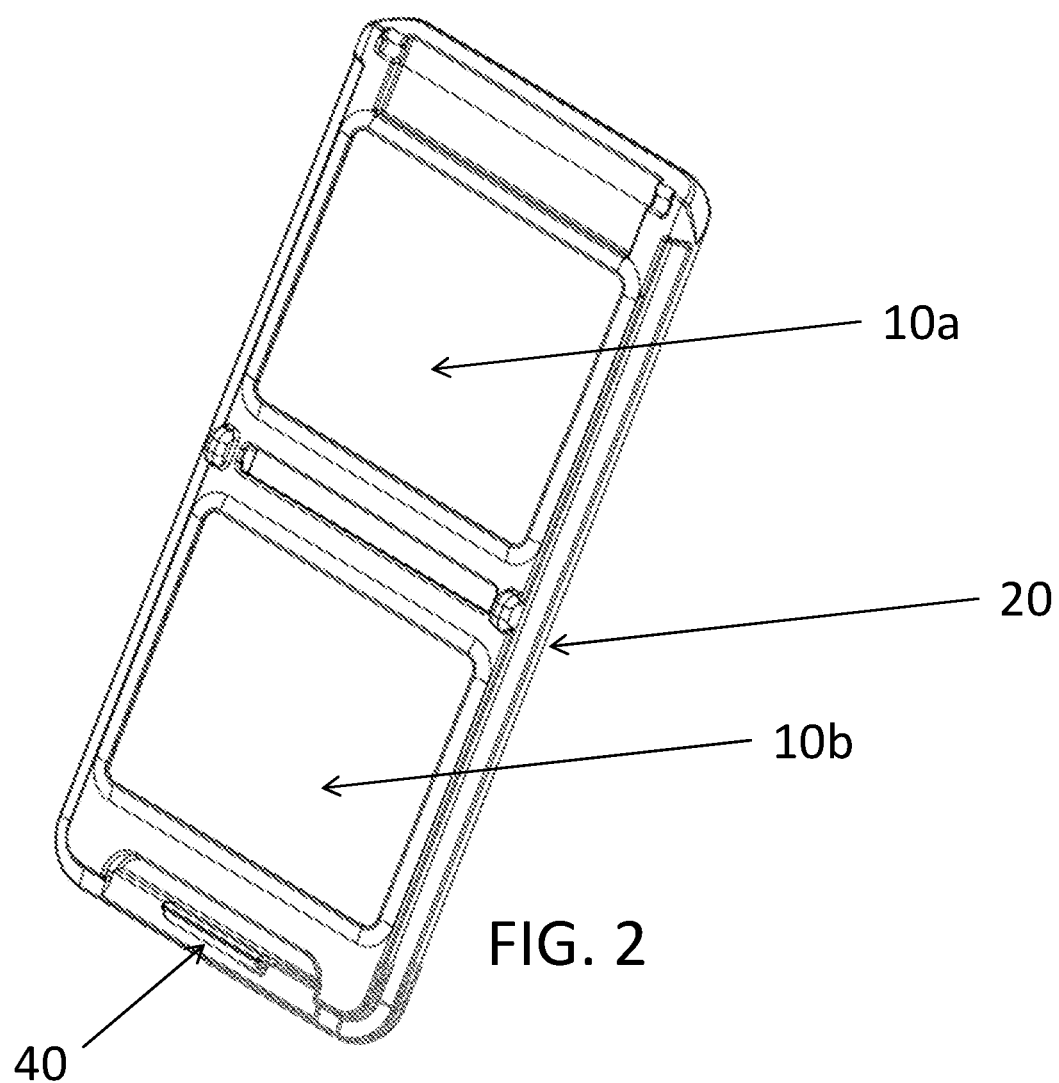
FIG. 2 depicts an isometric view of the underside of an example finger brace that could be used in FIG. 1, detached from the flexible member and the case.
Figure 3:
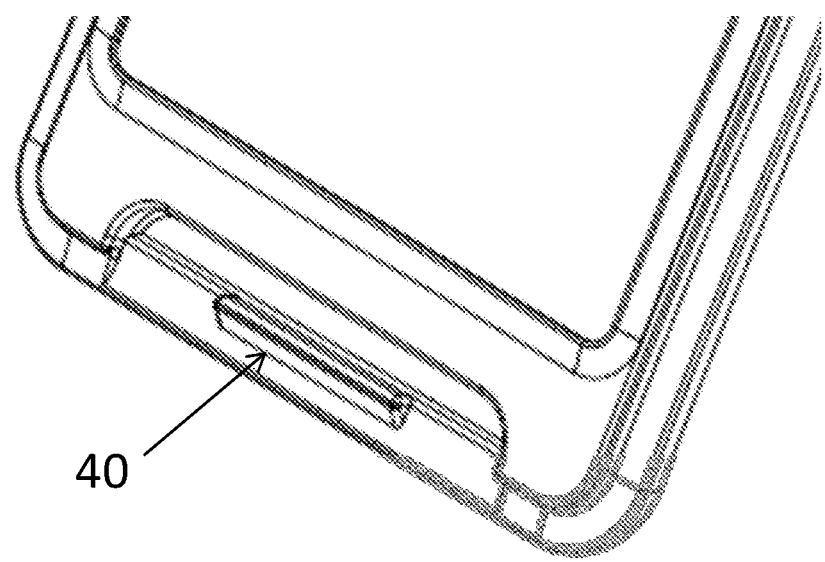
FIG. 3 depicts a close up isometric view of the bottom of the underside of the finger brace of FIG. 2.

FIG. 2 depicts an isometric view of the underside of an example finger brace 20 useful as the brace shown in FIG. 1, but in FIG. 2 finger brace 20 is shown detached from case 100 and flexible member 30. In the embodiment shown in FIG. 2, the underside of finger brace 20 includes pads 10a and 10b to make finger brace 20 more comfortable for the user's fingers. In some embodiments, the underside of finger brace 20 also includes a protrusion 40 near one end for catching the interchangeable covers that slide onto the finger brace. A close-up view of protrusion 40 on finger brace 20 is shown in FIG. 3 and is discussed in more detail below.

Figure 4:
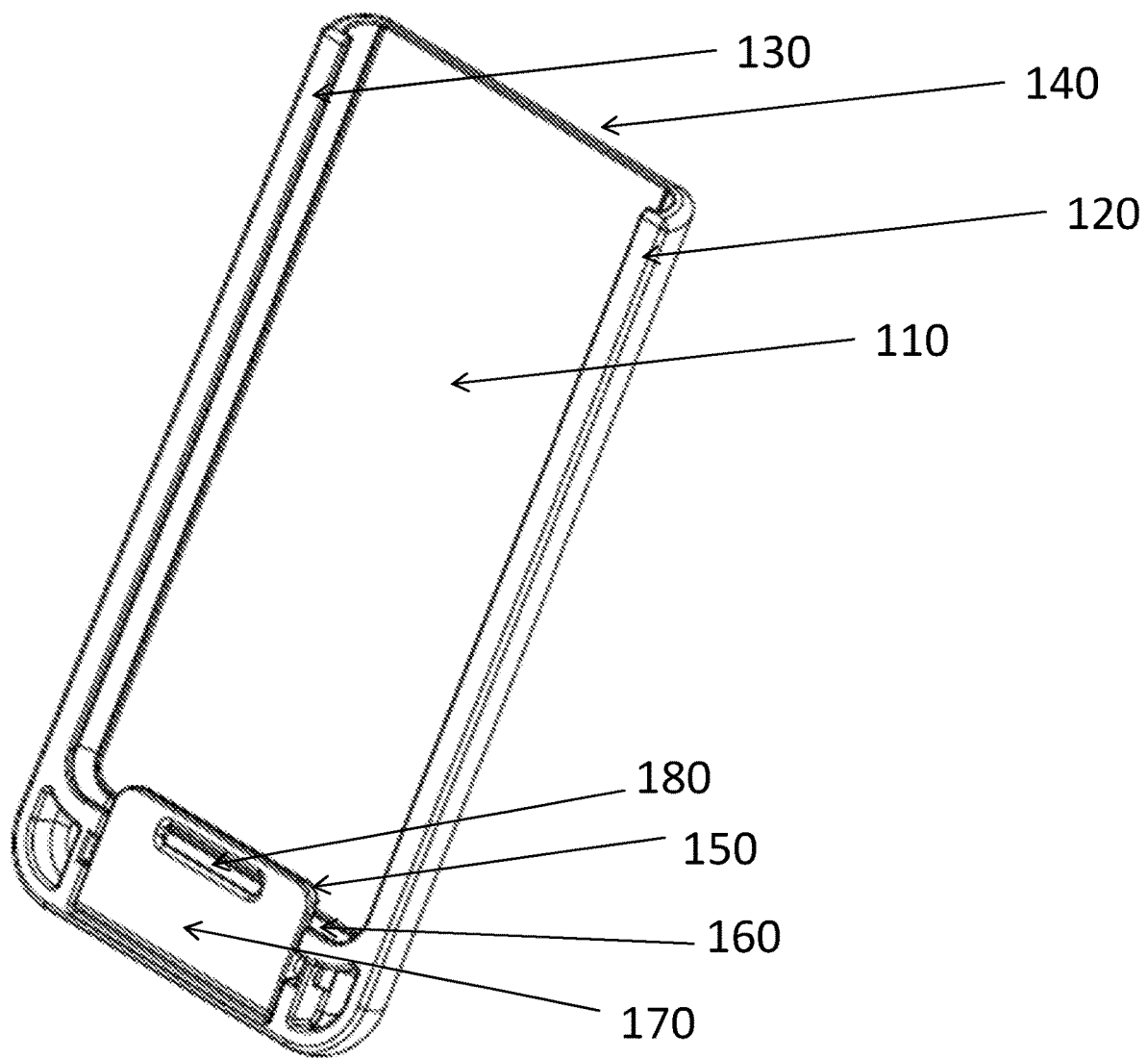
FIG. 4 depicts an isometric view of an exemplary interchangeable cover for a finger brace such as that shown in FIGS. 1-3.

FIG. 4 depicts an isometric view of the underside of an exemplary interchangeable cover 110 for finger brace 20. Interchangeable cover 110 may include one or more ornamental or decorative features, including designs, colors, patterns, textures, or advertising elements such as logos (or combinations of more than one of those). In addition or alternatively, interchangeable cover 110 may include particular materials, such as foam, leather, rubber, plastic, silicone, vinyl, snakeskin (real or artificial), sequins, or cloth of various sorts. Different units of interchangeable covers 110 may have different decorative features or materials (or combinations of features and materials), so that a user can change covers 110 as desired. Different covers can be sold separately, as a package of covers, together with finger brace 20, or together with a cover 110 containing finger brace 20. A user can thereby select a desired interchangeable cover for finger brace 20 from a plurality of cover options, with each cover including its own unique decorative elements or unique material (or both), and secure the chosen interchangeable cover to the finger brace. In this way, the different covers with different decorative elements or different materials are interchangeable and can be swapped according to user preferences.

Interchangeable cover 110 can be made from composite materials. In some embodiments, for example, the main pieces are plastic with an outer surface layer that is vinyl.

Cover 110 is shown as covering all or nearly all of the outer-facing surface of finger brace 20, but in other embodiments, cover 110 may cover only part of finger brace 20 or have gaps to allow parts of finger brace 20 to show through, which may form part of a desired pattern.

In other embodiments, cover 110 may cover a substantial portion or nearly all of the inner-facing surface (i.e., the surface facing rear surface 70) of finger brace 20 as well. For example, if flexible member 30 is formed as a narrow cord rather than as a strap, cover 110 may wrap around finger brace 20 and cover all of the inside surface other than a narrow slot to allow passage of the cord; indeed the slot may need to extend only about half-way along cover 110 if flexible member 30 is positioned at the middle of finger brace 20, and one entire end of finger brace 20 can be covered in that instance.

In some embodiments, including the exemplary embodiment shown in FIG. 4, interchangeable cover 110 includes side rails 120 and 130 for guiding interchangeable cover over finger brace 20 at an open end 140 of the interchangeable cover, and for preventing finger brace 20 from falling out of interchangeable cover 110. Rails 120 and 130 are shown in FIG. 4 as protruding from the sides of cover 110 at the ends of the sides, so as to cause the cover 110 to wrap slightly around the inner surface of finger brace 20. In the above-discussed embodiment where cover 110 covers much of the inner surface of finger brace 20, the extensions covering such inner surface are those rails. Alternatively, either of both of the rails may protrude at an intermediate place on the sides of cover 110. In yet another alternative, the rails may comprise recesses or slots in the sides that engage an element protruding from at least one side of finger brace 20 with which cover 110 engages. Any form of rails suitable to guide cover 110 over all or a significant part of the outside surface of finger brace 20 may be used.

Figure 5:
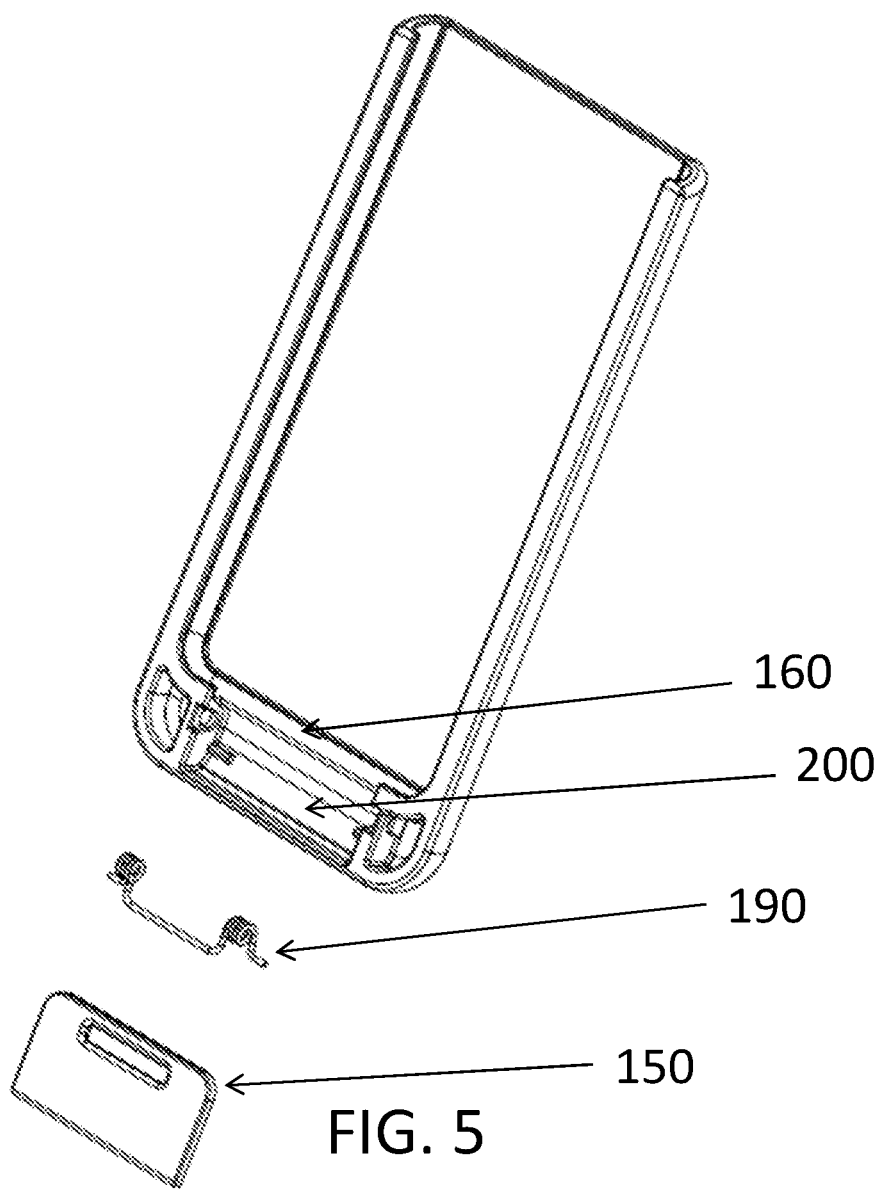
FIG. 5 is an exploded view of the interchangeable cover of FIG. 4, depicting as separate parts a sliding mechanism, a spring, and a clip, all included in the interchangeable cover.

Near the other end of the interchangeable cover is a stop bar 160 (depicted in FIG. 5) that stops the interchangeable cover from sliding further when the end of finger brace 20 makes contact with stop bar 160.

Figure 6:
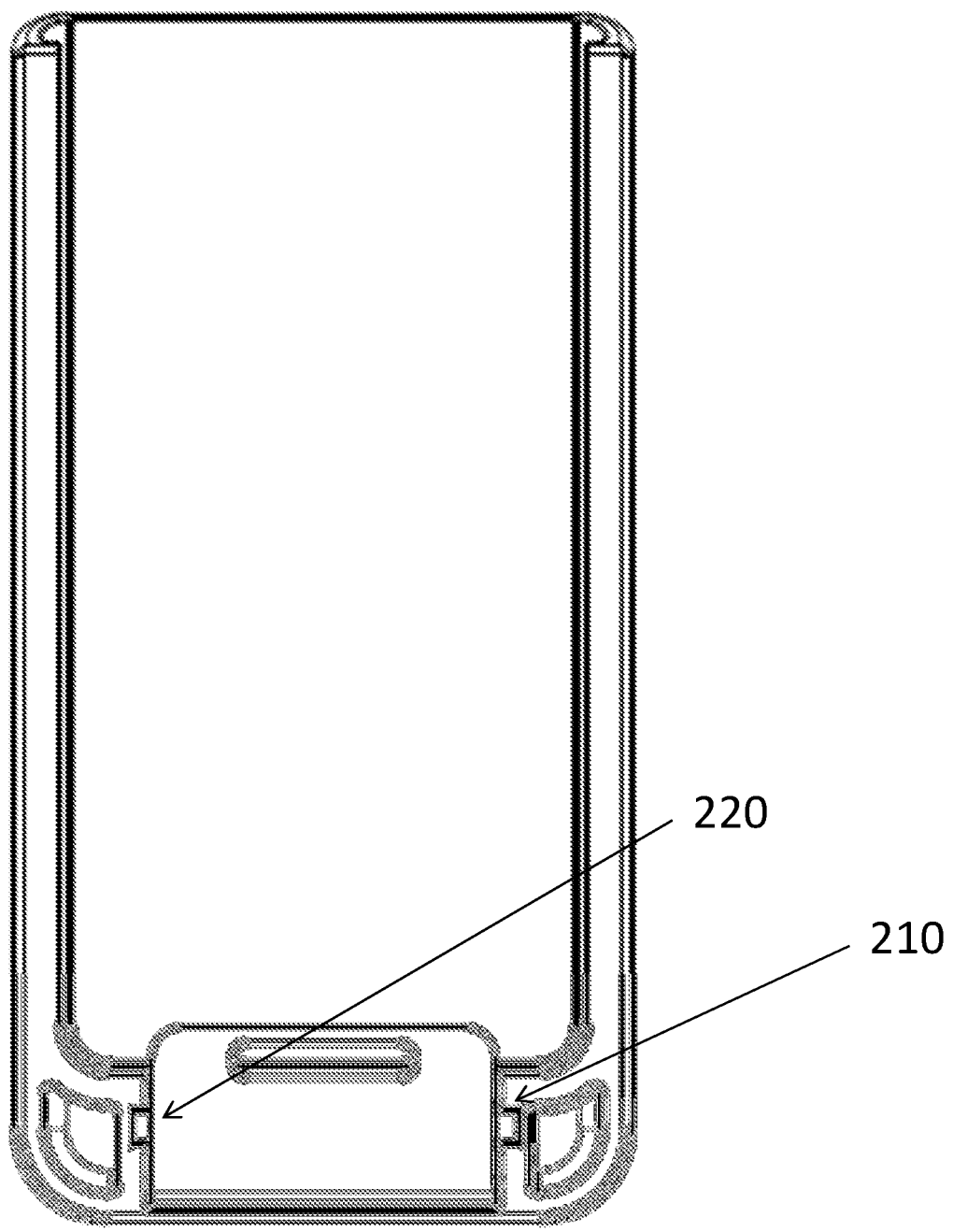
FIG. 6 depicts the underside of the interchangeable cover of FIG. 4.

In some embodiments, a clip 150 on the interchangeable cover is used to secure cover 110 and finger brace 20 together, as shown in FIG. 4. In some embodiments, stop bar 160 acts as a fulcrum for clip 150. In other embodiments, such as the embodiment shown in FIG. 6, posts 210 and 220 act as a fulcrum for clip 150, and one end of clip 150 simply rests on stop bar 160. In FIG. 4, clip 150 is shown with a flat surface 170 on one side of the fulcrum and a recess 180 (depicted as an oblong hole) on the other side of the fulcrum. A spring 190 (depicted in FIG. 5) can be attached under clip 150 to spring load the clip so that it is normally closed, i.e., the end of clip 150 with recess 180 is urged toward the body of cover 110. In such embodiments, to insert interchangeable cover 110, a user presses on flat surface 170 (which can be labeled with the word "push," for example), which presses clip 150 into a cavity 200 (depicted in FIG. 5) located between stop bar 160 and the end of cover 110 opposing end 140, which rotates clip 150 around the fulcrum (whether formed by posts 210, 220 or formed by stop bar 160) and accordingly raises the other end of clip 150, i.e., the end having recess 180.

Figure 7:
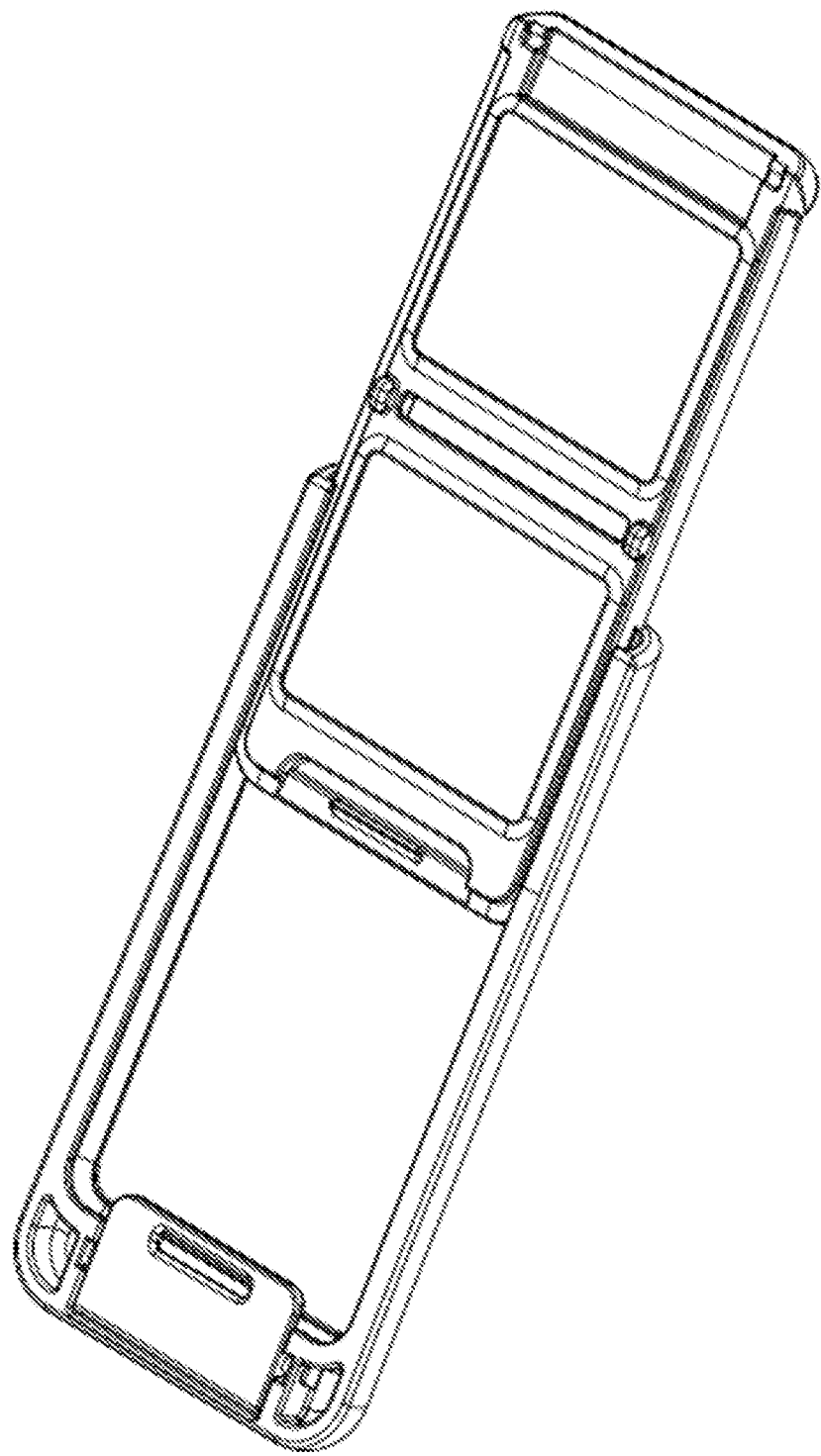
FIG. 7 depicts the underside of the finger brace of FIG. 2 with the interchangeable cover of FIG. 4 sliding over it but not snapped into place.
Figure 8:
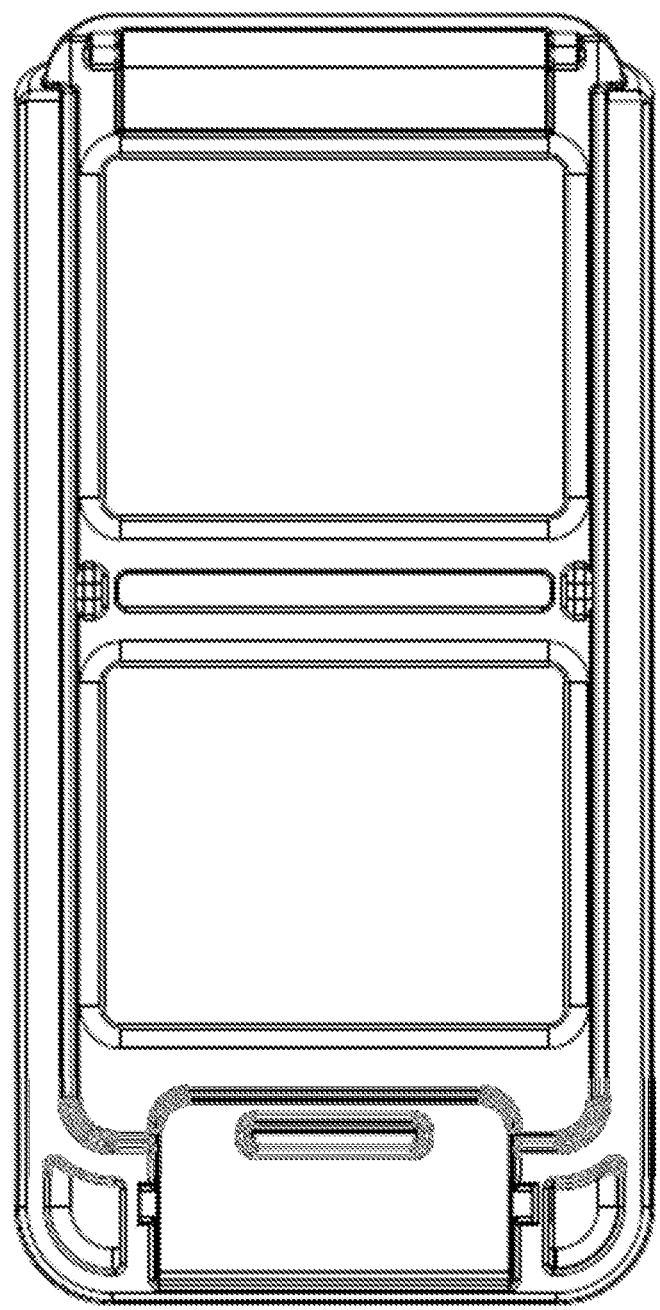
FIG. 8 depicts the underside of the finger brace of FIG. 2 after the interchangeable cover has slid over it and snapped into place.
Figure 9:
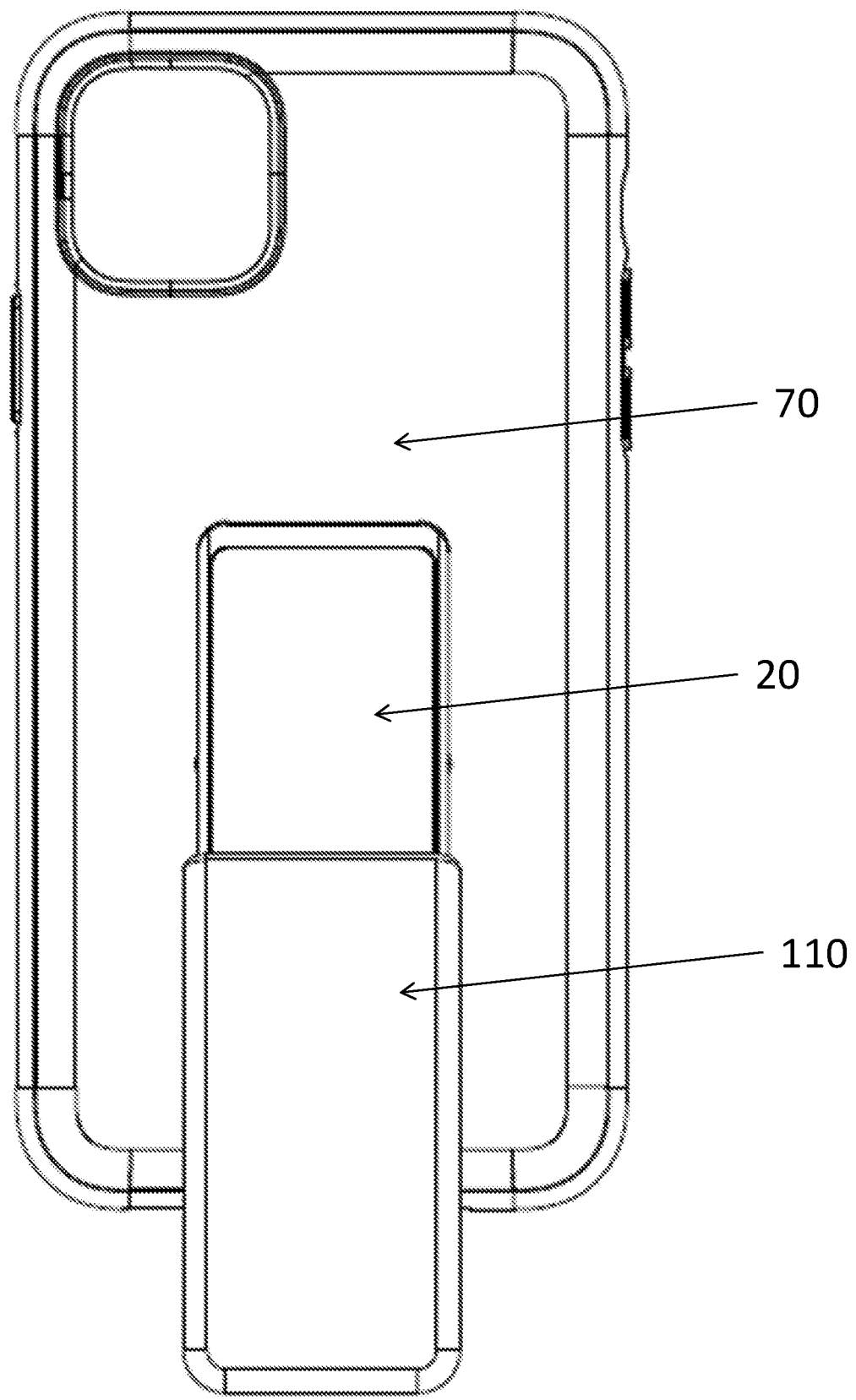
FIG. 9 depicts the topside of the finger brace of FIG. 2 connected to the case with the interchangeable cover sliding over it but not snapped into place.
Figure 10:
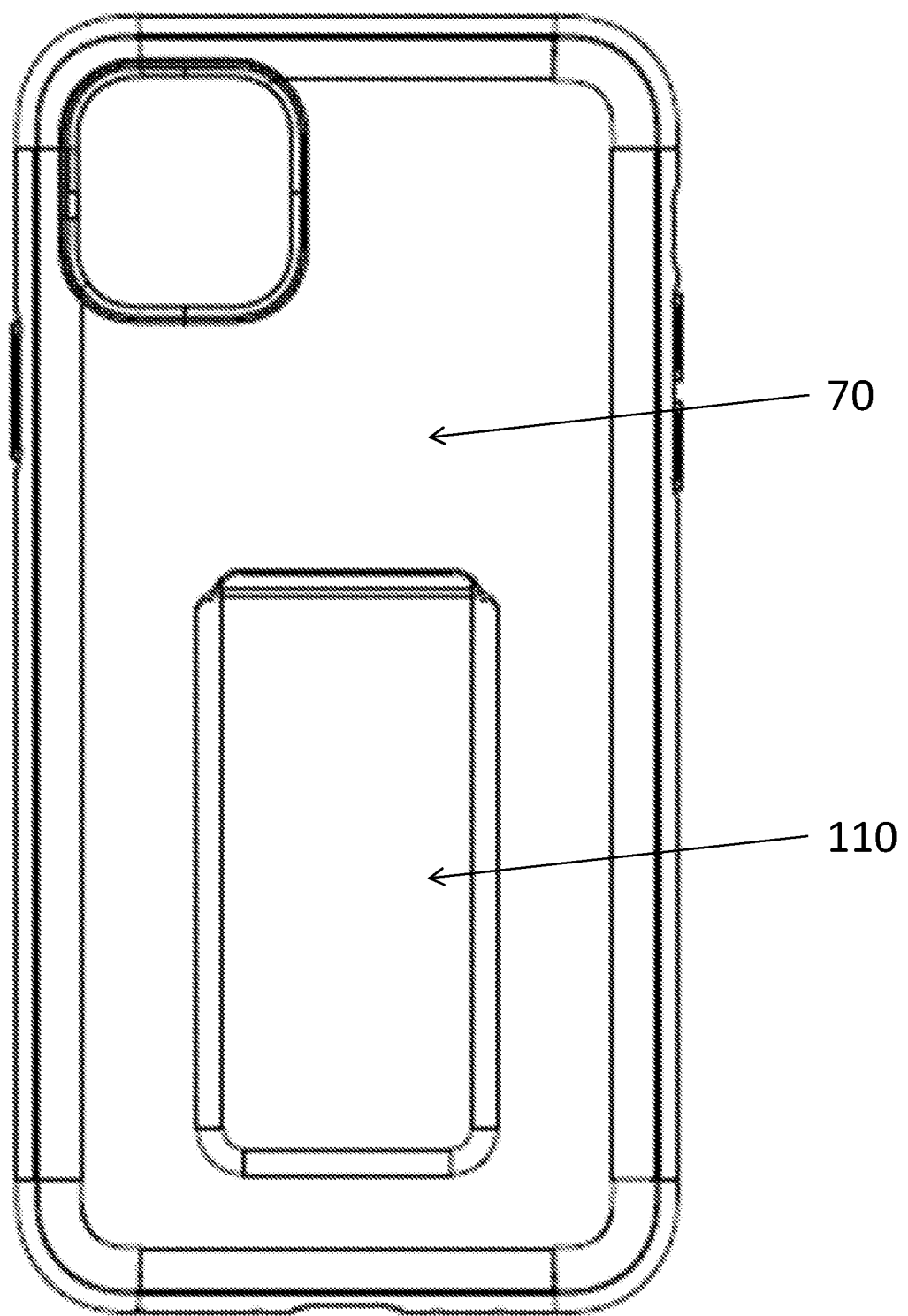
FIG. 10 depicts the topside of the finger brace of FIG. 2 connected to the case after the interchangeable cover has slid over it and snapped into place.

FIG. 7 depicts the underside of finger brace 20 with interchangeable cover 110 sliding over it but not snapped into place, to demonstrate how cover 110 slides into place. FIG. 9 shows a top view of finger brace 20 attached to case 100 with interchangeable cover 110 sliding over it but not snapped into place. When the user finishes inserting finger brace 20 into interchangeable cover 110 (touching stop bar 160), the user releases the flat surface 170 of clip 150, and spring 190 forces the end of clip 150 having recess 180 toward finger brace 20. In this normally closed position, recess 180 engages protrusion 40 (see FIG. 3) on the underside of finger brace 20. FIG. 8 depicts the underside of finger brace 20 after interchangeable cover 110 has slid over it and snapped into place. Alternatively (not shown), clip 150 may have a protrusion on its underside (in place of recess 180), which engages a recess in finger brace 20 (in place of protrusion 40). FIG. 10 shows a top view of finger brace 20 attached to case 100 after interchangeable cover 110 has slid over it and snapped into place.

Once clip 150 is engaged with finger brace 20, as seen in FIG. 8, the interchangeable cover 110 cannot be removed merely by sliding it relative to finger brace 20. Instead, the user must press flat surface 170 again to disengage clip 150 and thereafter slide interchangeable cover 110 off of finger brace 20.

In the foregoing Detailed Description, various features can be grouped together in several example embodiments for the purpose of streamlining the disclosure. This method of disclosure is not to be interpreted as reflecting an intention that any embodiment requires more features than are expressly recited in the corresponding claim. Rather, inventive subject matter may lie in less than all features of a single disclosed example embodiment. Thus, the present disclosure shall also be construed as implicitly disclosing any embodiment having any suitable set of one or more disclosed or claimed features (i.e., a set of features that are neither incompatible nor mutually exclusive) that appear in the present disclosure, including those sets that may not be explicitly disclosed herein.

The scope of the originally filed claims does not necessarily encompass the whole of the subject matter disclosed herein. The originally filed claims are hereby incorporated into the Detailed Description, with each claim standing on its own as a separate disclosed embodiment. The scope of subject matter encompassed by each claim shall be determined by the recitation of only that claim.

The conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. The words "comprising," "including," "having," and variants thereof, wherever they appear, shall be construed as open ended terminology, with the same meaning as if the phrase "at least" were appended after each instance thereof.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessary.

Unless specifically noted, it is intended that the words and phrases in the specification and the claims be given their plain, ordinary, and accustomed meaning to those of ordinary skill in the applicable arts.

The use of the words "function," "means" or "step" in the Detailed Description or Description of the Drawings or claims is not intended to somehow indicate a desire to invoke the special provisions of 35 U.S.C. § 112, § 6, to define the invention. To the contrary, if the provisions of 35 U.S.C. § 112, § 6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, § 6.

What is claimed is:

1. A removable cover for a finger brace, comprising:
    a) a cover having (i) an open area at a first end, (ii) a second end, and (iii) left and right side rails allowing an object to slide into the cover from the first end toward the second end;
    b) a stop bar blocking the object from being inserted further into the cover;
    c) a spring-loaded clip arranged across the stop bar and having a first end and a second end that rotate in opposite directions around a fulcrum;
    d) a catch at the first end of the spring-loaded clip, wherein the spring-loaded clip is arranged to cause the catch to normally engage with the object inserted into the cover; and
    e) a recess between the stop bar and the second end of the cover, positioned to receive the second end of the spring-loaded clip when a user presses the second end of the spring-loaded clip against a spring force of the spring-loaded clip, thereby causing the first end of the spring-loaded clip to be urged away from the finger brace and to disengage with the object inserted into the cover.

2. The removable cover of claim 1, wherein the catch is a protrusion positioned to engage with a recess in the object inserted into the cover.

3. The removable cover of claim 1, wherein the catch is a recess positioned to engage with a protrusion on the object inserted into the cover.

4. The removable cover of claim 1, further comprising at least a portion of the surface of the removable cover including decorative elements.

5. The removable cover of claim 1, further comprising at least a portion of the surface of the removable cover being vinyl.

6. The removable cover of claim 1, further comprising at least one additional removable cover, each of said at least one additional removable covers being also in accordance with claim 1 and having at least one decorative element or material different from each other of the removable covers, whereby the removable covers are interchangeable.

7. The removable cover of claim 1 further comprising a finger brace coupled to a case for a mobile device with an elastic member.

\* \* \* \* \*